(12) United States Patent
Markel

(10) Patent No.: US 9,180,796 B2
(45) Date of Patent: Nov. 10, 2015

(54) LONGITUDINAL ADJUSTER FOR A VEHICLE SEAT AND VEHICLE SEAT

(71) Applicant: Johnson Controls Components GmbH & Co. KG, Kaiserslautern (DE)

(72) Inventor: Christian Markel, Alzey (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 14/395,901

(22) PCT Filed: Jun. 20, 2013

(86) PCT No.: PCT/EP2013/062908
§ 371 (c)(1),
(2) Date: Oct. 21, 2014

(87) PCT Pub. No.: WO2014/001196
PCT Pub. Date: Jan. 3, 2014

(65) Prior Publication Data
US 2015/0130242 A1 May 14, 2015

(30) Foreign Application Priority Data

Jun. 26, 2012 (DE) .......................... 10 2012 012 848
Jul. 31, 2012 (DE) .......................... 10 2012 015 343

(51) Int. Cl.
*F16M 13/00* (2006.01)
*B60N 2/07* (2006.01)
*B60N 2/015* (2006.01)
*B60N 2/42* (2006.01)
*B60N 2/08* (2006.01)
(Continued)

(52) U.S. Cl.
CPC .......... *B60N 2/0722* (2013.01); *B60N 2/01583* (2013.01); *B60N 2/073* (2013.01); *B60N 2/0705* (2013.01); *B60N 2/0732* (2013.01); *B60N 2/0806* (2013.01); *B60N 2/4221* (2013.01)

(58) Field of Classification Search
CPC .. B60N 2/073; B60N 2/01583; B60N 2/0705; B60N 2/4221; B60N 2/0732; B60N 2/0806
USPC .................. 248/424, 429, 430; 297/344.1
See application file for complete search history.

(56) References Cited

U.S. PATENT DOCUMENTS 5,755,422 A * 5/1998 Susko et al. .................. 248/430
5,957,535 A * 9/1999 Pasternak et al. ............. 297/337
(Continued)

FOREIGN PATENT DOCUMENTS

DE 103 04 574 A1 8/2004
DE 20 2006 005 525 U1 7/2006
(Continued)

*Primary Examiner* — Gwendolyn W. Baxter
(74) *Attorney, Agent, or Firm* — McGlew and Tuttle, P.C.

(57) ABSTRACT

A longitudinal adjuster for a vehicle seat (1) includes a lower rail (5) and an upper rail (3) guided displaceably in the longitudinal direction therein. An upper clamp (30) is connected to the upper rail (3) and has at least one upper blocking region (39). A lower clamp (50) is connected to the lower rail (5) and has at least one lower blocking region (59). The lower blocking region (59) and the upper blocking region (39) are normally spaced apart from each other and intermesh in the event of a crash. A locking shackle (34), connected to the upper clamp (30), includes a bolt (42) running in the transverse direction. The upper clamp (30) has a cutout (32) within which the bolt (42) is arranged, and the bolt (42) is arranged behind the rear end of the upper rail (3) in the longitudinal direction.

15 Claims, 3 Drawing Sheets

(56) References Cited

U.S. PATENT DOCUMENTS

| | | | |
|---|---|---|---|
| 8,196,888 B2* | 6/2012 | Yamada et al. | 248/429 |
| 2005/0224680 A1* | 10/2005 | Strubel et al. | 248/429 |
| 2005/0230591 A1* | 10/2005 | Smith et al. | 248/429 |

FOREIGN PATENT DOCUMENTS

| | | | |
|---|---|---|---|
| DE | 102011120531 A1 * | 6/2013 | |
| EP | 0 816 158 A2 | 1/1998 | |

* cited by examiner

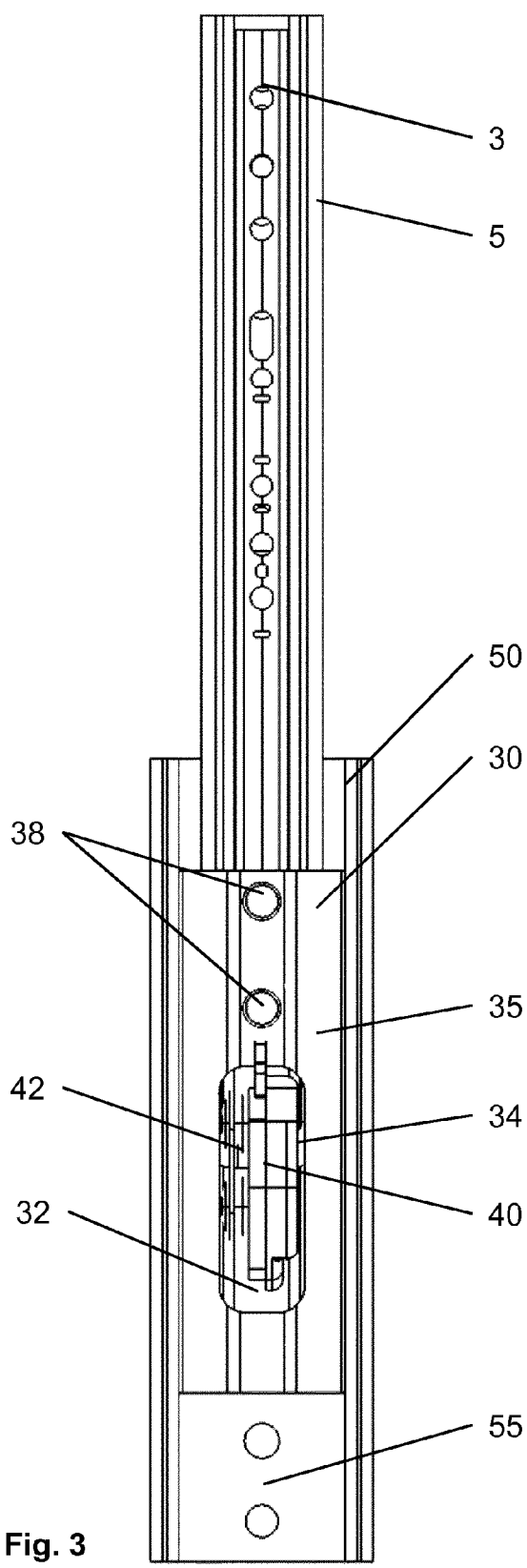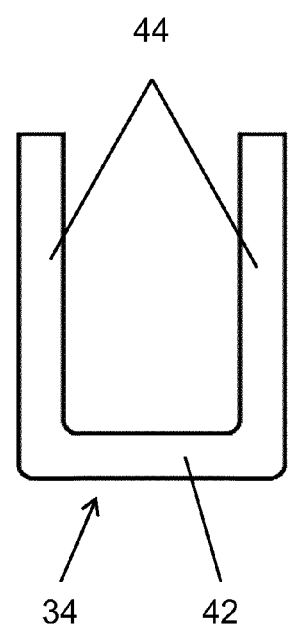
Fig. 3
Fig. 4

LONGITUDINAL ADJUSTER FOR A VEHICLE SEAT AND VEHICLE SEAT

CROSS REFERENCE TO RELATED APPLICATIONS

This application is a United States National Phase Application of International Application PCT/EP2013/062908 filed Jun. 20, 2013 and claims the benefit of priority under 35 U.S.C. §119 of German Patent Applications DE 10 2012 012 848.7 filed Jun. 26, 2012 and DE 10 2012 015 343.0 filed Jul. 31, 2012, the entire contents of which are incorporated herein by reference.

FIELD OF THE INVENTION

The invention to a longitudinal adjuster for a vehicle seat having a lower rail and an upper rail displaceably guided in a longitudinal direction and with an upper clamp connected to the upper rail and a lower clamp connected to the lower rail. The lower clamp has at least one lower blocking region and the upper clamp has at least one upper blocking region, wherein the lower blocking region and the upper blocking region normally are spaced apart from one another and interlocked in the event of a crash. The invention further relates to a vehicle seat having the longitudinal adjuster.

BACKGROUND OF THE INVENTION

A generic longitudinal adjuster as well as a generic vehicle seat are disclosed in DE 20 2006 005 525 U1. The vehicle seat comprises in this case a seat part which is able to be connected by means of front feet and rear feet to two seat rail pairs of a longitudinal adjuster. Each of the seat rail pairs comprises one respective lower rail connected to the vehicle structure as well as one respective upper rail displaceably guided in the lower rail. Each of said feet comprises a lock which is able to be locked to one respective locking pin attached to the upper rail. By locking the locks by means of the locking pins, the seat part is able to be connected to the rail pair.

Each locking pin is fastened by means of a retaining clamp to the upper rail. The locking pin in this case is welded to the retaining clamp and the retaining clamp is screwed to the upper rail. Forces occurring in the event of a crash are then introduced from the seat part via the upper rails and the lower rails into the vehicle structure.

A generic vehicle seat having a generic longitudinal adjuster is disclosed in EP 0 816 158 A2. The longitudinal adjuster comprises a clamp connected to the lower rail and a clamp connected to the upper rail. In the event of a crash said clamps are interlocked and the forces occurring in the event of a crash are introduced into the vehicle structure via the clamps.

SUMMARY OF THE INVENTION

An object of the invention is to improve a longitudinal adjuster of the type mentioned in the introduction, in particular the strength of the longitudinal adjuster in the event of a crash.

Accordingly, a generic longitudinal adjuster for a vehicle seat comprises a lower rail and an upper rail displaceably guided therein in the longitudinal direction, wherein an upper clamp is connected to the upper rail, wherein a lower clamp is connected to the lower rail, wherein the lower clamp has at least one lower blocking region and the upper clamp has at least one upper blocking region, wherein the lower blocking region and the upper blocking region normally are spaced apart from one another and interlocked in the event of a crash.

According to the invention it is provided that a locking shackle is connected to the upper clamp, said locking shackle comprising a pin extending in the transverse direction, that the upper clamp has a recess, the pin being arranged inside said recess, and that the pin is arranged in the longitudinal direction behind the rear end of the upper rail.

The locking shackle in this case serves for connecting a seat part of the vehicle seat by means of a lock and the recess is designed such that, when locked to the pin of the locking shackle, the lock penetrates the recess. As a result, a lock may be used which has a greater extent in the transverse direction and thus a greater strength. The extent of the lock in the transverse direction is thus only limited by the clearance between the edge regions of the lower rail.

As a result, forces occurring in the event of a crash are additionally introduced from the seat part via the upper clamp and the lower clamp into the vehicle structure. As a result, the strength of the longitudinal adjuster is increased in the event of a crash.

Preferably the at least one upper blocking region is formed by bending back twice a retaining region of the upper clamp. Such a double bending back procedure is relatively easy to implement.

Preferably, the at least one lower blocking region is also formed by bending back twice a side region of the lower clamp. Such a double bending back procedure is relatively easy to implement.

According to an advantageous embodiment of the invention, the upper clamp extends in the longitudinal direction to the rear beyond the upper rail. As a result, the region of the overlap of the upper blocking region with the lower blocking region is increased.

Similarly, according to an advantageous embodiment of the invention, the lower clamp extends in the longitudinal direction to the rear beyond the lower rail. As a result, the region of the overlap of the lower blocking region with the upper blocking region is increased.

Advantageously, the locking shackle has two arms extending in the longitudinal direction, said arms being connected by the pin. As a result, the strength of the connection between the upper clamp and the locking shackle is increased.

Preferably the upper clamp comprises a fastening region which is fastened to the upper rail, wherein the fastening region comprises two bulged portions for receiving the arms.

The recess extends in this case preferably in the longitudinal direction and in the transverse direction inside the fastening region.

The mounting of the longitudinal adjuster is simplified if the locking shackle is welded to the upper clamp. Preferably, the locking shackle and the upper clamp are welded together before fastening to the upper rail.

This object is also achieved by a vehicle seat having the features cited in claim 10, said vehicle seat comprising at least one longitudinal adjuster according to the invention.

The vehicle seat advantageously comprises a seat part which is fastened to the upper rail of the longitudinal adjuster.

Preferably, at least one foot is attached to the seat part, a lock being provided on said foot.

In this case the lock preferably cooperates with the locking shackle.

Preferably the lock engages in the recess.

Preferably the lock in this case encompasses the pin of the locking shackle.

The invention is described in more detail hereinafter with reference to an advantageous exemplary embodiment shown in the drawings. The invention is, however, not limited to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a plan view of a longitudinal adjuster from above, with a lock;

FIG. 4 is a plan view of a locking shackle from above; and

DESCRIPTION OF THE PREFERRED EMBODIMENTS

Figure 1:
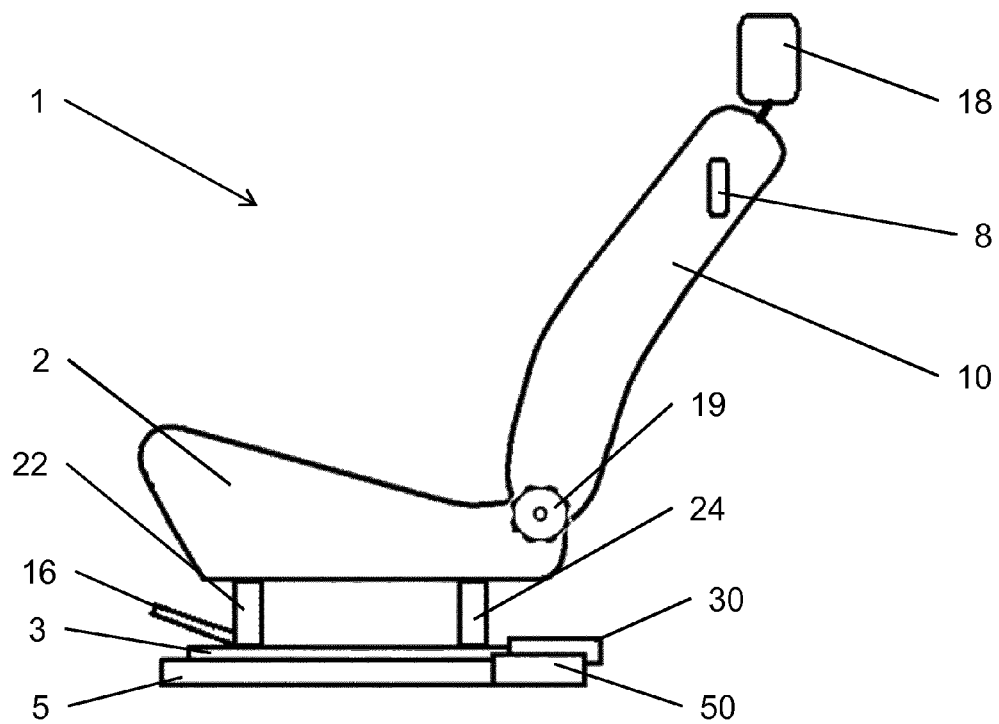
FIG. 1 is a schematic view of a vehicle seat.
Figure 2:
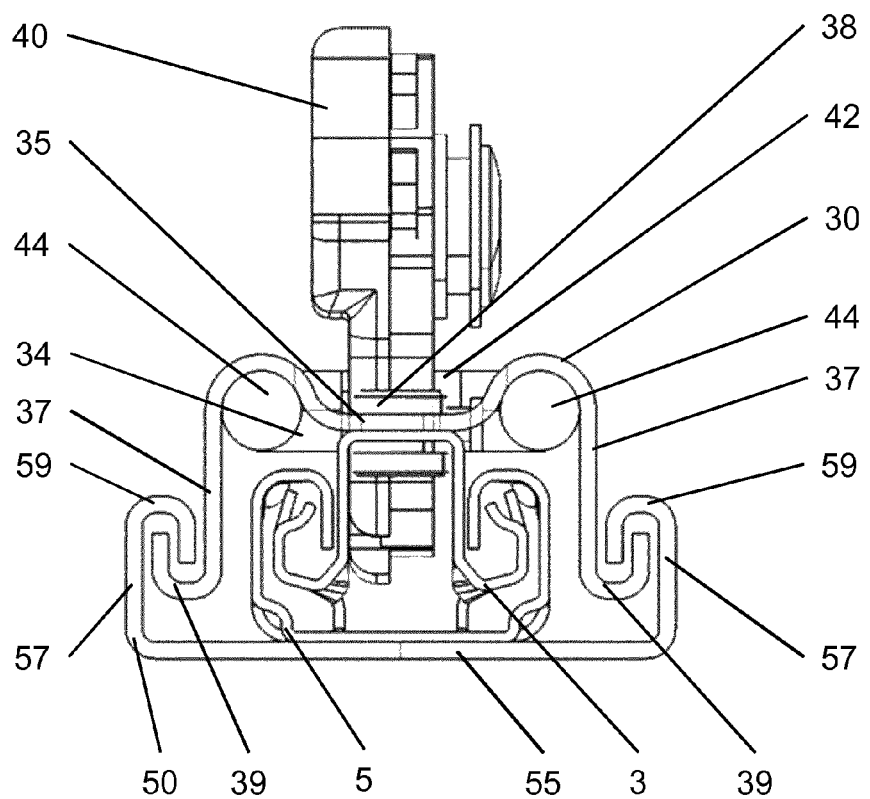
FIG. 2 is a sectional view through a seat rail pair of a longitudinal adjuster perpendicular to the longitudinal direction with a lock.
Figure 5:
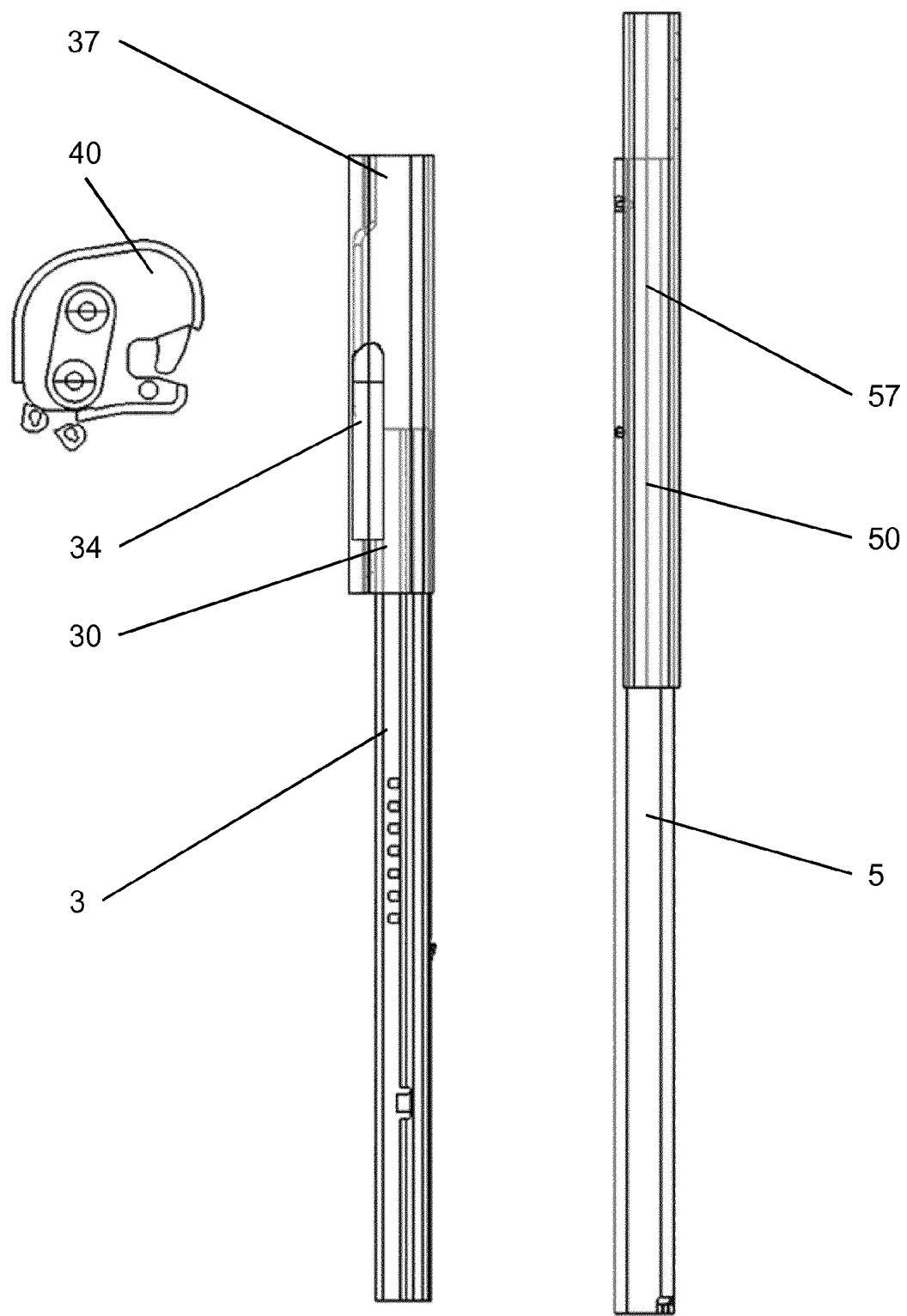
FIG. 5 is an exploded view of a longitudinal adjuster with a lock.

Referring to the drawings in particular, a vehicle seat 1 for a motor vehicle has a seat part 2 and a backrest 10 which is attached thereto and which is adjustable in inclination.

The arrangement of the vehicle seat 1 inside the vehicle and the usual direction of travel thereof define the directional information used hereinafter. In this case a direction oriented perpendicular to the ground is denoted hereinafter as the vertical direction and a direction perpendicular to the vertical direction and perpendicular to the direction of travel is denoted hereinafter as the transverse direction.

By means of a laterally arranged backrest adjustment fitting 19 to be operated manually, the backrest 10 is able to be adjusted in inclination which means that the angle between the seat part 2 and the backrest 10 is adjustable. Alternatively, an electrical drive is also conceivable.

Moreover, a head restraint 18 which is adjustable in height and inclination is attached to the upper end of the backrest 10 which is remote from the seat part 2 in the vertical direction.

The vehicle seat 1 is longitudinally adjustable by means of a longitudinal adjuster which has two lower rails 5 connected to the vehicle floor of the motor vehicle, as well as two upper rails 3. This means that the seat part 2 is able to be adjusted together with the backrest 10 in the longitudinal direction which in the present case corresponds to the direction of travel. To this end, each of the upper rails 3 is displaceably guided in one respective lower rail 5 extending parallel in the longitudinal direction. Each of the two upper rails 3 forms in each case a seat rail pair with the assigned lower rail 5. The longitudinal adjuster thus comprises two seat rail pairs extending in parallel.

By means of a locking device each of the two upper rails 3 is able to be locked to the respective lower rail 5. By means of an unlocking bar 16, the locking device is able to be unlocked. Alternatively, an electrical drive is conceivable here.

The vehicle seat 1 further comprises on both sides one respective front foot 22 and one respective rear foot 24 which are attached to the seat part 2. The feet 22, 24 serve for fastening the seat part 2 to the upper rails 3. A lock 40 is provided on each rear foot 24, by means of said lock the rear foot 24 being able to be locked in a releasable manner to the respective upper rail 3. Such a lock 40 is disclosed, for example, in DE 103 04 574 B4, the relevant disclosure thereof being expressly incorporated therein.

On each upper rail 3 one respective locking shackle 34 is provided, the corresponding lock 40 of the rear foot 24 cooperating with said locking shackle. The locking shackle 34 is of approximately U-shaped design and has two arms 44 extending in the longitudinal direction as well as a pin 42 connecting the two arms 44, extending in the transverse direction. The lock 40 acts in this case on the pin 42.

In the vertical direction an upper clamp 30 is attached to the upper rail 3 from above. The upper clamp 30 in the present case is fastened to the upper rail 3 by two rivets 38 arranged offset to one another in the longitudinal direction. Alternatively it is also conceivable to weld or screw the upper clamp 30 to the upper rail 3. The upper clamp 30 extends in the longitudinal direction to the rear beyond the upper rail 3.

The upper clamp 30 in cross section is of approximately U-shaped design and comprises a fastening region 35 which is fastened by means of the rivets 38 to the upper rail 3, as well as two retaining regions 37. Viewed in the longitudinal direction, the retaining regions 37 extend parallel to one another in the vertical direction and are connected together at their upper ends by the fastening region 35 extending in the transverse direction.

The fastening region 35 comprises in the two edge regions which the retaining regions 37 adjoin, one respective bulged portion for receiving the arms 44 of the locking shackle 34. The locking shackle 34 is thus located in the vertical direction below the fastening region 35 and is enclosed in the transverse direction by the retaining regions 37. The locking shackle 34 is connected, in the present case welded, to the upper clamp 30.

The upper clamp 30 further comprises a recess 32 which extends in the longitudinal direction and in the transverse direction inside the fastening region 35 and which is arranged in the longitudinal direction to the rear of the upper rail 3.

In this case, the locking shackle 34 is arranged such that the pin 42 in the longitudinal direction comes to rest inside the recess 32 of the upper clamp 30. The pin 42 of the locking shackle 34 is thus located in the longitudinal direction behind the rear end of the upper rail 3.

For fastening the seat part 2 to the upper rail 3, the rear foot 24 is positioned over the recess 32 and pressed down in the vertical direction. The open lock 40 in this case penetrates the recess 32, encompasses the pin 42 of the locking shackle 34 and is automatically locked.

For unlocking, an actuating element 8 is provided, said actuating element in the present case being arranged in the upper region of the backrest 10. When actuating the actuating element 8 which is coupled by means of a Bowden cable to the lock 40, the lock 40 is unlocked and releases the pin 42 of the locking shackle 34. Subsequently, the lock 40 is able to be pulled out of the recess 32 in the vertical direction.

Each front foot 22 in the present case is fastened by means of a rotary bearing on the upper rail 3. When the locks 40 of the rear feet 24 are unlocked, the seat part 2 thus may be pivoted about a pivot axis extending in the transverse direction and defined by said rotary bearings. This pivoting movement of the seat part 2 and the backrest 10 connected thereto, for example, simplifies access for an occupant to a seat row which is arranged behind the vehicle seat 1.

Alternatively, however, it is also conceivable that the front foot 22 is designed similar to the rear foot 24, and also has a lock 40. In this case, by actuating the actuating element 8 the locks 40 of the front feet are also unlocked. As a result, the seat part 2 is able to be fully released from the upper rails 3 and the vehicle seat 1 is thus able to be removed from the vehicle.

In the vertical direction a lower clamp 50 is attached to the lower rail 5 from below. The lower clamp 50 in the present case is welded to the lower rail 5. The lower clamp 50 extends in the longitudinal direction to the rear beyond the lower rail 5.

The lower clamp 50 in cross section is of approximately U-shaped design and comprises a bottom region 55 which is fastened to the lower rail 5, as well as two side regions 57. The bottom region 55 is located in this case in the vertical direction below the lower rail 5 and above the vehicle floor. Viewed in the longitudinal direction, the side regions 57 extend parallel to one another in the vertical direction and are connected together at their lower ends by the bottom region 55 extending in the transverse direction.

The side regions 57 of the lower clamp 50 are bent back twice at their ends remote from the bottom region 55. Said bent-back portions of the side regions 57 extend in this case initially in the transverse direction to the inside, i.e. toward one another. Further along, the bent-back portions of the side regions 57 extend downwards in the vertical direction.

These double bent-back portions of the side regions 57 of the lower clamp 50 form one respective blocking region 59. The lower clamp 50 thus has two lower blocking regions 59 which are located at the ends of the side regions 57 remote from the bottom region 55.

Also the retaining regions 37 of the upper clamp 30 are bent back twice at their ends remote from the fastening region 35. Said bent-back portions of the retaining regions 37 in this case extend initially in the transverse direction outwardly, i.e. away from one another. Further along, the bent-back portions of the retaining regions 37 extend upwards in the vertical direction.

These double bent-back portions of the retaining regions 37 of the upper clamp 30 form in each case an upper blocking region 39. The upper clamp 30 thus has two upper blocking regions 39 which are located at the ends of the retaining regions 37 remote from the fastening region 35.

The bent-back portions of the side regions 57 and the bent-back portions of the retaining regions 37 mutually encompass one another here. In normal use of the vehicle seat 1, the bent-back portions of the side regions 57 and the bent-back portions of the retaining regions 37 are not in contact. Normally, therefore, the lower blocking regions 59 and the upper blocking regions 39 are spaced apart from one another.

In the event of a crash, in particular in the event of a front crash, the vehicle seat 1 is subjected to an acceleration relative to the vehicle upwardly in the vertical direction. In this case, the rear foot 24 pulls with the lock 40 on the locking shackle 34 in the vertical direction. If the fastening region 35 twists with this load acting on the upper clamp 30, the bent-back portions of the retaining regions 37 migrate in the vertical direction upwards and are interlocked with the bent-back portions of the side regions 57 of the lower clamp 50.

In the event of a crash, therefore, the lower blocking regions 59 and the upper blocking regions 39 are interlocked. As a result, forces occurring in the event of a crash are additionally forwarded from the seat part 2 via the upper clamp 30 and the upper blocking regions 39 into the lower blocking regions 59 and the lower clamp 50 and into the vehicle structure. As a result, the fastening region 35 of the upper clamp 30 is prevented from bending up further and the locking shackle 34 is also prevented from bending up further.

The features disclosed in the above description, the claims and the drawings may be of significance both individually and also in combination for implementing the invention in the various embodiments thereof. While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat (1), the longitudinal adjuster comprising:
   a lower rail;
   an upper rail displaceably guided in the lower rail in a longitudinal direction;
   an upper clamp connected to the upper rail, the upper clamp having at least one upper blocking region;
   a lower clamp connected to the lower rail, the lower clamp having at least one lower blocking region, wherein the lower blocking region and the upper blocking region are spaced apart from one another in a normal state and are interlocked in the event of a crash; and
   a locking shackle connected to the upper clamp, said locking shackle comprising a pin extending in a transverse direction, wherein the upper clamp has a recess, the pin being arranged inside said recess, and wherein the pin is arranged in the longitudinal direction behind a rear end of the upper rail.

2. A longitudinal adjuster as claimed in claim 1, wherein the at least one upper blocking region is formed by bending back twice a retaining region of the upper clamp.

3. A longitudinal adjuster as claimed in claim 1, wherein the at least one lower blocking region is formed by bending back twice a side region of the lower clamp.

4. A longitudinal adjuster as claimed in claim 1, wherein the upper clamp extends rearwardly in the longitudinal direction beyond the upper rail.

5. A longitudinal adjuster as claimed in claim 1, wherein the lower clamp extends rearwardly in the longitudinal direction beyond the lower rail.

6. A longitudinal adjuster as claimed in claim 1, wherein the locking shackle has two arms extending in the longitudinal direction, said arms being connected by the pin.

7. A longitudinal adjuster as claimed in claim 6, wherein:
   the upper clamp comprises a fastening region which is fastened to the upper rail; and
   the fastening region comprises two bulged portions for receiving the arms.

8. A longitudinal adjuster as claimed in claim 7, wherein the recess extends in the longitudinal direction and in the transverse direction inside the fastening region.

9. A longitudinal adjuster as claimed in claim 1, wherein the locking shackle is welded to the upper clamp.

10. A vehicle seat comprising at least one longitudinal adjuster comprising:
    a lower rail;
    an upper rail displaceably guided in the lower rail in a longitudinal direction;
    an upper clamp connected to the upper rail, the upper clamp having at least one upper blocking region;
    a lower clamp connected to the lower rail, the lower clamp having at least one lower blocking region, wherein the lower blocking region and the upper blocking region are spaced apart from one another in a normal state and are interlocked in the event of a crash; and
    a locking shackle connected to the upper clamp, said locking shackle comprising a pin extending in a transverse direction, wherein the upper clamp has a recess, the pin being arranged inside said recess, and wherein the pin is arranged in the longitudinal direction behind a rear end of the upper rail.

11. A vehicle seat as claimed in claim 10, further comprising a seat part fastened to the upper rail of the longitudinal adjuster.

12. A vehicle seat as claimed in claim 10, further comprising:
   at least one foot attached to the seat part; and
   a lock provided on said at least one foot.

13. A vehicle seat as claimed in claim 12, wherein the lock cooperates with the locking shackle.

14. A vehicle seat as claimed in claim 12, wherein the lock engages in the recess.

15. A vehicle seat as claimed in claim 12, wherein the lock encompasses the pin.

\* \* \* \* \*